United States Patent [19]

Smith et al.

[11] Patent Number: 5,350,795
[45] Date of Patent: Sep. 27, 1994

[54] AQUEOUS OIL AND WATER REPELLENT COMPOSITIONS WHICH CURE AT AMBIENT TEMPERATURE

[75] Inventors: Richard S. Smith, Mendota Heights, Minn.; Frans Audenaert, Kaprijke, Belgium

[73] Assignee: Minnesota Mining and Manufacturing Company, St. Paul, Minn.

[21] Appl. No.: 89,041

[22] Filed: Jul. 9, 1993

Related U.S. Application Data

[63] Continuation-in-part of Ser. No. 890,669, May 28, 1992, abandoned, which is a continuation-in-part of Ser. No. 727,878, Jul. 10, 1991, abandoned.

[51] Int. Cl.$^5$ ............... C08J 3/00; C08K 3/00; C08L 75/00; C08L 27/12
[52] U.S. Cl. ....................... 524/507; 524/520; 524/544; 524/805; 525/199; 525/200; 528/70; 428/423.1
[58] Field of Search ............ 524/507, 520, 544, 805; 528/70; 525/199, 200; 428/423.1

[56] References Cited

U.S. PATENT DOCUMENTS

| | | | |
|---|---|---|---|
| Re. 30,337 | 7/1980 | Loudas | 252/8 |
| 2,592,069 | 4/1952 | Reid | 260/89 |
| 2,642,416 | 6/1953 | Ahlbrecht et al. | 260/83 |
| 2,803,615 | 8/1957 | Ahlbrecht et al. | 260/29 |
| 2,826,564 | 3/1958 | Bovey et al. | 260/83 |
| 2,995,542 | 8/1961 | Brown | 260/79 |
| 3,078,245 | 2/1963 | Heine | 260/29 |
| 3,081,274 | 3/1963 | Heine | 260/29 |
| 3,102,103 | 8/1963 | Ahlbrecht et al. | 260/29 |
| 3,282,905 | 11/1966 | Fasick et al. | 260/89 |
| 3,291,843 | 12/1966 | Fritz et al. | 260/614 |
| 3,304,278 | 2/1967 | Hauptschein et al. | 260/29 |
| 3,325,163 | 6/1967 | Off et al. | 270/59 |
| 3,574,791 | 4/1971 | Sherman et al. | 260/884 |
| 3,654,244 | 4/1972 | Pittman et al. | 260/79 |
| 3,728,151 | 4/1973 | Sherman et al. | 117/138 |
| 3,748,268 | 7/1973 | Loudas | 252/90 |
| 3,759,874 | 9/1973 | Gresham | 528/70 |
| 3,787,351 | 1/1974 | Olson | 260/40 |
| 3,816,167 | 6/1974 | Schultz et al. | 117/138 |
| 3,896,035 | 7/1975 | Schultz et al. | 252/8.75 |
| 3,901,727 | 8/1975 | Loudas | 134/4 |
| 3,920,614 | 11/1975 | Kirimoto et al. | 260/63 |
| 4,029,585 | 6/1977 | Dettre et al. | 252/8 |
| 4,043,923 | 8/1977 | Loudas | 252/8 |
| 4,043,964 | 8/1977 | Sherman et al. | 260/29.6 |
| 4,107,055 | 8/1978 | Sukornick et al. | 252/8 |
| 4,115,605 | 9/1978 | Hultman et al. | 427/377 |
| 4,160,777 | 7/1979 | Loudas | 206/456 |
| 4,264,484 | 4/1981 | Patel | 260/29 |
| 4,289,892 | 9/1981 | Soch | 560/26 |
| 4,419,298 | 12/1983 | Falk et al. | 260/501 |
| 4,668,726 | 5/1987 | Howells | 524/225 |
| 4,681,790 | 7/1987 | Fong | 428/96 |
| 4,788,287 | 11/1988 | Matsuo et al. | 544/196 |
| 4,792,354 | 12/1988 | Matsuo et al. | 106/2 |
| 4,795,793 | 1/1989 | Amimoto et al. | 526/243 |
| 4,859,754 | 8/1989 | Maekawa et al. | 526/245 |
| 4,983,666 | 1/1991 | Zavatteri et al. | 524/539 |

FOREIGN PATENT DOCUMENTS 0435220 7/1991 European Pat. Off. .
5-59109575 8/1991 Japan .

OTHER PUBLICATIONS

J. Am. Chem Soc., 49, 3181 (1927).
Sorenson & Campbellm "Preparative Methods of Polymer Chemistry" 2d ed., Interscience Publishers (1968) pp. 72–154 and 202–287.
WPIL, File Supplier, Derwent Publications, Ltd., London GB.

*Primary Examiner*—Paul R. Michl
*Assistant Examiner*—Patrick Niland
*Attorney, Agent, or Firm*—Gary L. Griswold; Walter N. Kirn; Carole Truesdale

[57] ABSTRACT

Fluorochemical compositions for treating textile fibers and fabrics to impart oil and water repellency without thermal treatment are provided. The compositions comprise an aqueous, substantially organic solvent free, solution or dispersion of (a) a fluorochemical acrylate copolymer comprised of a fluorinated acrylate monomer, polyalkylene glycol acrylate or methacrylate, and polyalkylene glycol diacrylate or dimethacrylate; and (b) a polyalkoxylated polyurethane having pendant perfluoroalkyl groups comprised of an aliphatic or aromatic tri- or higher order isocyanate, a fluorinated alcohol, amine, or mercaptan, and a poly(oxyalkylene) diol or dithiol.

24 Claims, No Drawings

AQUEOUS OIL AND WATER REPELLENT COMPOSITIONS WHICH CURE AT AMBIENT TEMPERATURE

This application is a continuation-in-part of patent application Ser. No. 07/890,669, filed May 28, 1992, now abandoned which is a continuation-in-part of patent application Ser. No. 07/727,878, filed Jul. 10, 1991, now abandoned.

This invention relates to compositions for treating textile fibers to impart oil and water repellency, the treated substrates and the method of treating the substrates.

The need for the removal of spots and stains from fabrics and carpets and a variety of other substrate surfaces is well known.

The treatment of textiles with fluorochemicals containing fluoroaliphatic radicals to impart water and oil repellency has been known for some time. For example U.S. Pat. No. 3,574,791 (Sherman and Smith) and U.S. Pat. No. 3,728,151 (Sherman and Smith) disclose relatively high molecular weight materials which include block or graft copolymers, or block and graft copolymers, which have at least two different segments, one of which is highly fluorinated and oleophobic and the other of which is water solvatable or hydratable. The water solvatable or hydratable segment bears pluralities of structural units containing characteristic solvatable polar groups such as ether oxygen atoms.

U.S. Pat. No. 3,816,167 (Schultz and Sherman) discloses applying a treatment of fluoroaliphatic comonomer and polyalkylene gylcol cross-linked in situ by an aldehyde-containing prepolymer to provide stain release to synthetic fibers during laundering.

U.S. Pat. No. 4,043,964 (Sherman and Smith) discloses a coating which provides durably soil-resistant carpet which contains (a) at least one phase of a specified water-insoluble addition polymer derived from a polymerizable ethylenically unsaturated monomer free of non-vinylic fluorine and (b) at least one phase of a specified water-insoluble fluorinated component containing a fluoroaliphatic radical of at least 3 carbon atoms. The monomer from which the fluorinated component is formed may contain dicarboxylic acid, glycol, diamine, hydroxyamine, etc.

U.S. Pat. No. 4,264,484 (Patel) discloses a liquid carpet treating composition containing a water-insoluble addition polymer derived from polymerizable ethylenically unsaturated monomer free of nonvinylic fluorine and having at least one major transition temperature higher than about 25° C. and a water-insoluble fluoroaliphatic radical- and aliphatic chlorine-containing ester having at least one major transition temperature higher than about 25° C. Such treating compositions, however, are mainly intended for mill treatment of the textile where treatment steps, such as heating are generally applied.

U.S. Pat. Re. No. 30,337 and U.S. Pat. No. 4,160,777 (Loudas) disclose compositions containing detergent compatible organic fluorochemical compounds and an anti-redeposition agent e.g. an ammonium salt of the hydrolyzed copolymer of styrene and maleic anhydride for imparting water and oil repellency and soil resistance to textiles and to detergent solutions containing such compositions for cleaning textiles simultaneously with imparting the water and oil repellency and soil resistance.

U.S. Pat. No. 3,654,244 (Pittman et al.) discloses polymers for providing both soil repellency and soil releasability to fibrous materials. The polymers are copolymerization products of at least two different monomers, one imparting oleophobic properties which is an acrylate or methacrylate which contains a terminal perfluoroalkyl group of 3 to 18 perfluorinated carbon atoms, and the other hydrophilic properties which is an acrylate or methacrylate of a specified hydrocarbon alcohol.

U.S. Pat. No. 3,787,351 (Olson) discloses oligomers which act as wetting agents in filled or reinforced synthetic resin composites, the oligomers having a plurality of fluoroaliphatic radicals linked to solubilizing poly(oxyalkylene) moieties.

U.S. Pat. No. 3,920,614 (Kirimoto et al.) discloses an oil- and water-repellent copolymer having high soil release properties which is prepared by copolymerizing at least 25 weight percent of a polymerizable fluoroalkyl monomer and 5–50 weight percent of a polymerizable acrylate or methacrylate containing poly(oxyethylene) units. The copolymer may optionally contain comonomer and/or a acrylonitrile or methacrylonitrile.

U.S. Pat. No. 4,289,892 (Soch) discloses preparing rigid or flexible polyurethane foams with high or low density and uniform cellular structure using fluoroaliphatic radical-substituted poly(oxyalkylene) polyols as foam stabilizers.

U.S. Pat. No. 4,859,754 (Maekawa et al.) discloses a water and oil repellent having desoiling properties composed of a polyfluorinated group-containing copolymer obtained by copolymerizing a polyfluorinated group-containing monomer which can be an acrylate or methacrylate and an amphipathic monomer having a hydrophilic moiety and a lipophilic moiety which can have as the hydrophilic moiety a polyoxyalkylene chain.

U.S. Pat. No. 4,795,793 (Amimoto et al.) discloses fluorine-containing copolymers comprising 30 to 90% by weight of the constituting unit derived from (a) a polymerizable compound having a perfluoroalkyl group of 4 to 20 carbon atoms, 10 to 59% by weight of the constituting unit derived from (b) cyclohexyl or benzyl ester of acrylic acid or methacrylic acid and 0.1 to 10% by weight of the constituting unit derived from (c) at least one selected from the group consisting of polyethylene glycol diacrylate and N-methylolacrylamide.

U.S. Pat. No. 3,748,268 (Loudas) describes a stable one-phase composition which is useful as a spot and stain remover comprising a hydrocarbon solvent of low volatility, water, surfactant, organic co-solvent and an anti-soiling agent. As organic co-solvents are used chlorinated alkylenes like trichloroethylene or perchloroethylene or aromatic hydrocarbons like benzene, toluene and xylene. Useful anti-soiling agents include brittle polymeric resins, such as styrene-maleic anhydride copolymers, colloidal alumina, colloidal suspensions of silica, polyvinylpyrrolidone, polyacrylate/acrylic acid copolymers, vinyl acetate/maleic anhydride copolymers, carboxymethylcellulose, carboxyl-containing resins and water-soluble melamineformaldehyde condensates.

U.S. Pat. No. 3,901,727 (Loudas) discloses a container-stable, water-dilutable alkaline cleaning composition which has, in an aqueous medium (a) a water-dispersible detergent which is capable of drying to a non-oily, non-tacky residue, (b) a water-dispersible organic carboxyl-containing material which can be the ammonium salts of styrene-maleic anhydride copolymers, a water-dispersible Lewis base, (d) a zinc or zirconium coordination complex, (e) a fluorochemical compound which is water-dispersible at or about about pH 8, has acid functionality and forms zinc or zirconium salts which are capable of imparting water and oil repellency.

U.S. Pat. No. 4,419,298 (Falk) discloses ammonium and amine salts of acids having gem-di-perfluoroalkyl groups useful for providing oil and water repellency to cellulosic and polyamide materials. Styrene/maleic anhydride polymers are disclosed as sizing agents useful in aqueous emulsions for topical application which contain the ammonium or amine salts of the gem-di-perfluoroalkyl group containing acids.

U.S. Pat. No. 4,107,055 (Sukornick) describes a fabric coating composition including a polymer having a glass transition temperature above room temperature such as a styrene/maleic anyhdride copolymer, an ionic non-polymeric fluorinated surfactant and a carrier.

U.S. Pat. No. 4,681,790 (Fong) describes a treating composition to impart water- and oil repellency as well as soil resistance containing fluorochemical compound A, a fluorochemical compound known to have utility with surfactants and/or detergents for providing oil and water repellency, and fluorochemical compound B, a fluoroaliphatic radical-containing poly(oxyalkylene), and an organic water-miscible solvent.

U.S. Pat. No. 4,668,726 (Howells) describes a blend of the mixture of a cationic and nonionic fluorochemical, a fluorochemical poly(oxyalkylene) and/or a hydrocarbon non-ionic surfactant.

U.S. Pat. No. 4,788,287 and U.S. Pat. No. 4,792,354 (Matsuo et al.) disclose a water and oil repellent compound having at least two terminal segments and an intermediate segment connecting the terminal segments and having a molecular weight of from 800 to 20,000, each terminal segment containing at least one polyfluoroalkyl group connected by a —CONH— linking group, the intermediate segment being a urethane oligomer containing at least two —CONH— linking groups in one molecule, and said terminal segments and intermediate segment being connected by a —CONH— linking group. The urethane oligomer of Matsuo et al. '354 further contains a hydrophilic molecular chain.

The above references disclose fluorochemical compounds or treating compositions which may be applied to textiles. These known fluorochemical treating agents have the disadvantage that they contain solvents which are no longer acceptable from a toxicological and environmental standpoint. Those treatment agents which do not contain such solvents and which are environmentally more acceptable generally require thermal treatment to achieve water and oil repellent properties.

The present invention provides fluorochemical compositions for treating textile fibers such as cotton, nylon, polyester, polyolefin, acrylic, acetate or blends thereof and fabrics such as apparel, upholstery and carpet to impart oil and water repellency without thermal treatment, e.g., applied at ambient temperature, i.e., 10° C. to 60° C. The fluorochemical compositions for providing oil and water repellency comprise an aqueous, substantially organic solvent free, solution or dispersion of (a) a fluorochemical acrylate copolymer comprising the reaction product of a fluorinated acrylate monomer, polyalkylene glycol acrylate or methacrylate, and polyalkylene glycol diacrylate or dimethacrylate; and (b) a polyalkoxylated polyurethane having pendant perfluoroalkyl groups comprised of an aliphatic or aromatic tri- or higher order isocyanate, a fluorinated alcohol, amine, or mercaptan, and a poly(oxyalkylene) diol or dithiol.

The composition may optionally contain a solid, non-tacky, water-soluble or water dispersible anti-soiling agent which, upon drying of the composition, is capable of rendering the substrate non-tacky and resistant to soiling, a fluorochemical ester, or a combination thereof.

Preferably, the fluorochemical acrylate polymer is present in an amount of about 10 to 50 weight percent, more preferably about 20 to 40 weight percent based on solids content. Preferably the polyalkoxylated polyurethane having pendant perfluoroalkyl groups is present in an amount of about 50 to 90 weight percent, more preferably about 50 to 70 weight percent based on solids content. The anti-soiling agent is present in an amount of about 0 to 30 weight percent, more preferably about 0 to 20 weight percent based on solids content. The fluorochemical ester is present in an amount of about 0 to 30 weight percent, more preferably about 10 to 20 weight percent based on solids content. When both the anti-soiling agent and the fluorochemical ester are used, the total amount of both products is preferably about 50 weight percent or less. Generally, the composition contains at least about 65% water.

The present invention, in another aspect, provides textile fibers and fabrics having oil and water repellency treated with the composition of the invention.

The present invention, in another aspect, provides a process for treating textile fibers and fabrics to provide oil and water repellency comprising treating the textile fibers or fabric with the composition of the invention and drying the treated fibers or fabric at ambient temperature.

The present invention also provides a composition comprising a polyalkoxylated polyurethane having pendant perfluoroalkyl groups which is represented by formula I

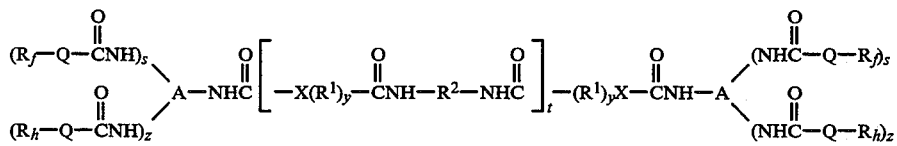

where
$R_f$ is a fluoroaliphatic radical,
$R_h$ is a non-fluorinated hydrocarbon radical,
Q is an organic linking group,
A is a residue of a tri- or higher order isocyanate, i.e., the residue being that portion of the tri- or higher order isocyanate minus the reacted —NCO groups,
$(R^1)y$ is a poly(oxyalkylene) moiety, $R^1$ being an oxyalkylene group with 2 to 6 carbon atoms or a cyclic ether or ester moiety having 2 to 6 carbon atoms and y is a number of about 20 to 50, preferably 25 to 40,
X is O, S or a linking group terminating in O or S, $R^2$ is a residue of a tri- or higher order isocyanate, two of the isocyanate groups of the tri- or higher order isocyanate forming the depicted urethane groups and the other isocyanate groups reacted to form pendant —$QR_f$ or —$QR_h$ groups, s is a number of at least 1 and can be 3 or higher, z is zero or a number of up to about 4, s+z is a number of about 4 or higher, and t is a number of at least about 10 and can be 40 or more, preferably 15 to 35.

The present invention also provides a method for imparting oil and water repellency to fibers and fabrics comprising (a) contacting said fiber or fabric at ambient temperature with an aqueous solution of the composition of formula I, and (b) allowing said fiber or fabric to dry at ambient temperature.

Surprisingly, the fluorochemical compositions of the invention can be applied and cured at ambient temperature to provide the desired oil and water repellency. Previous fluorochemical treatments which were water-borne required thermal curing treatment, or if no thermal curing was needed, the fluorochemical treatment was organic solvent borne.

The fluorochemical acrylate polymers useful in the present invention have randomly arranged repeating units

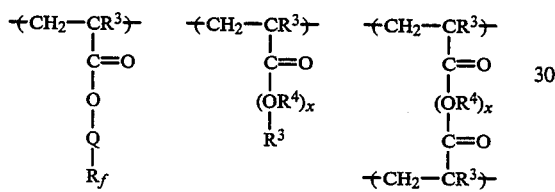

wherein $R_f$ is a fluoroaliphatic radical, $R^3$ is H or $CH_3$, $R^4$ is an alkylene group having 2 to 4 carbon atoms, Q is an organic linking group and x is an integer of at least 5, generally 10 to 75 and can be as high as 100.

The fluoroaliphatic group, designated herein as $R_f$ is a stable, inert, nonpolar, preferably saturated monovalent moiety which is both oleophobic and hydrophobic. The fluorinated polymer preferably comprises from 2 to about 25 $R_f$ groups and preferably comprises about 5 percent to about 30 percent, and more preferably about 8 percent to about 20 percent fluorine by weight based on the total weight of the oligomer, the loci of the fluorine being essentially in the $R_f$ groups. $R_f$ preferably contains at least about 3 carbon atoms, more preferably 3 to about 20 carbon atoms, and most preferably about 6 to about 12 carbon atoms. $R_f$ can contain straight chain, branched chain, or cyclic fluorinated alkyl groups or combinations thereof or combinations thereof with straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that each $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2$—, $(CF_3)_2CF$—, —$CF_2SF_5$, or the like. Perfluorinated aliphatic groups, i.e., those of the formula $C_nF_{2n+1}$, are the most preferred embodiments of $R_f$.

The fluoroaliphatic group, $R_f$, is linked to the ester group by a linking group designated Q. Linking group Q can be a covalent bond, a heteroatom, e.g., O or S, or an organic moiety. The linking group Q is preferably an organic moiety containing 1 to about 20 carbon atoms, and optionally containing oxygen, nitrogen-, or sulfur-containing groups or a combination thereof, and preferably free of functional groups, e.g., polytaerizable olefinic double bonds, thiols, easily abstracted hydrogen atoms such as cumyl hydrogens, and other such functionality known to those skilled in the art, that substantially interfere with free-radical oligomerization. Examples of structures suitable for linking group Q include straight chain, branched chain, or cyclic alkylene, arylene, aralkylene, oxy, oxo, thio, sulfonyl, sulfinyl, imino, sulfonamido, carboxamido, carbonyloxy, urethanylene, ureylene, and combinations thereof such as sulfonamidoalkylene. Preferred linking groups Q can be selected according to ease of preparation and commercial availability. Below is a partial representative list of suitable organic Q groups. For the purposes of this list, each k is independently an integer from 1 to about 20, g is an integer from 0 to about 10, h is an integer from 1 to about 20, R' is hydrogen, phenyl, or alkyl of 1 to about 4 carbon atoms, and R" is alkyl of 1 to about 20 carbon atoms.

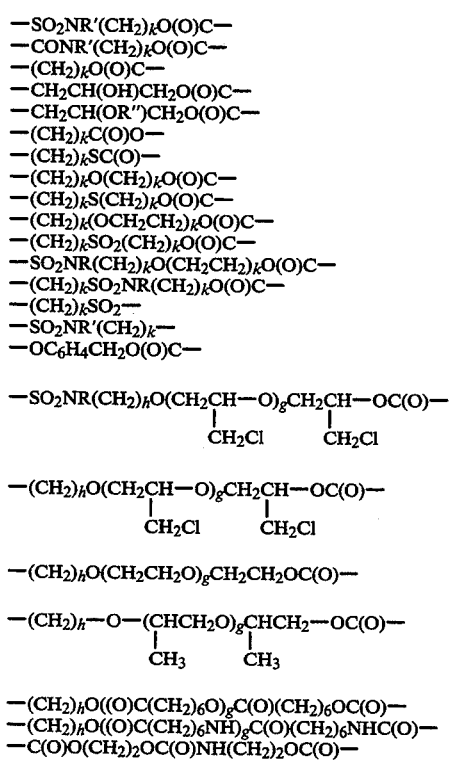

For linking $R_f$, Q is preferably alkylene or sulfonamido, or sulfonamidoalkylene.

In $(OR^4)_x$, $R^4$ is an alkylene group having 2 to 4 carbon atoms, such as

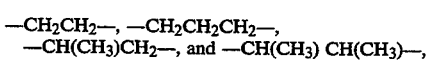

the oxyalkylene units in said poly(oxyalkylene) being the same, as in poly(oxypropylene), or present as a mixture, as in a straight or branched chain of randomly distributed oxyethylene and oxypropylene units or as in a straight or branched chain of blocks of oxyethylene units and blocks of oxypropylene units. The poly(oxyalkylene) chain can be interrupted by or include one or more catenary linkages, though it is preferred that such linkages be free of reactive functional groups containing active hydrogen atoms, providing such linkages do not substantially alter the solubility-imparting character of the poly(oxyalkylene) chain. [The term "active hydrogen atom" as used in this application means a hydrogen atom (other than an amido hydrogen atom) which is reactive with a Grignard reagent, as described in J. Am. Chem. Soc., 49, 3181 (1927).] Where said catenary linkages have three or more valences, they provide a means for obtaining a branched chain of oxyalkylene units. The poly(oxyalkylene) radicals in the oligomers can be the same or different, and they can be pendant. It is also preferred that the molecular weight of the poly(oxyalkylene) radical be between about 500 and 5000 or higher, e.g, 100,000 or more, more preferably 2000 to 4000, in order to obtain said desired solubility.

(Amimoto et al.), which are incorporated herein by reference.

A preferred polyethoxylated polyacrylate is a polyoxyethylene terpolymer of

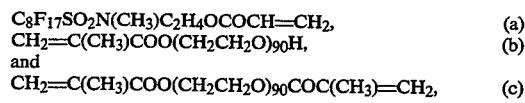

preferably in a 1:1 weight ration of a:(b+c) and a 3:1 weight ration of b:c.

Such polyalkoxylated polyacrylates are disclosed in U.S. Pat. No. 4,681,790 (Fong) which is incorporated herein by reference.

The polyalkoxylated polyurethane having pendant perfluoroalkyl groups can be represented by the formula I

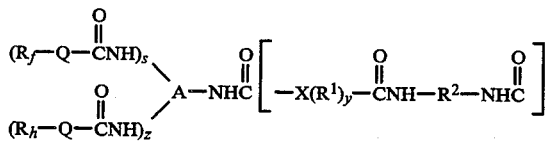

X is oxygen, sulfur or a linking group which is preferably an organic moiety containing 1 to about 20 carbon atoms, and optionally containing oxygen, nitrogen-, or sulfur- containing groups or a combination thereof, and preferably free of functional groups.

The polyacrylate polymers can be prepared, for example, by free radical initiated copolymerization of a fluoroaliphatic radical-containing acrylate with a poly(oxyalkylene) monoacrylate or diacrylate or mixtures thereof. The molecular weight of the polyacrylate polymer can be controlled by adjusting the concentration and activity of the initiator, concentration of monomers, and temperature, and by chain-transfer agents, such as thiols, e.g. n-octyl mercaptan. Fluoroaliphatic acrylates, such as described in the above preparation, are known in the art (e.g., see U.S. Pat. Nos. 2,803,615, 2,642,416, 2,826,564, 3,102,103, 3,282,905, and 3,304,278). The poly(oxyalkylene) acrylates used in the above preparation, and other acrylates useful for such purposes, can be prepared from commercially available hydroxy and alkoxy poly(oxyalkylene) materials, such as those sold under the trademarks PLURONIC, CARBOWAX, NECKS, and TRITON, by reacting such hydroxy materials in a known manner with acrylic acid, methacrylic acid, acryloyl chloride, or acrylic anhydride.

Other fluoroaliphatic radical-containing terminally ethylenically unsaturated monomers suitable for the preparation of the polymers of this invention, for example by copolymerizing with corresponding poly(oxyalkylene)-containing, terminally ethylenically unsaturated comonomers, are known in the art (e.g., see U.S. Pat. Nos. 2,592,069, 2,995,542, 3,078,245, 3,081,274, 3,291,843, and 3,325,163, and the ethylenically unsaturated materials suitable for providing fluoroaliphatic radical-containing structural units disclosed in U.S. Pat. No. 3,574,791). The fluorochemical acrylate polymers may also optionally contain units derived from other monomers such as alkyl acrylates, vinylidene chloride, and n-methylol acrylamide.

The fluorochemical acrylate polymers useful in the present invention are disclosed, for example, in U.S. Pat. No. 3,787,351 (Olson) and U.S. Pat. No. 4,795,793 where $R_f$, $R_h$, Q, A, X, $R^1$, $R^2$, s, t, y and z are as described above.

Generally, the polyalkoxylated polyurethanes have a weight average molecular weight of at least about 40,000, preferably about 65,000 to 250,000.

In formula I where there are a plurality of $R_f$ radicals, they are either the same or different. This also applies to a plurality of Q, A, $R^1$ and $R^2$ groups.

Generally, the polyalkoxylated polyurethanes will contain about 5 to 40 weight percent, preferably about 10 to 30 weight percent, of carbon-bonded fluorine. If the fluorine content is less than about 10 weight percent, impractical large amounts of the polymer will generally be required, while fluorine contents greater than about 35 weight percent generally result in polymers which have too low a solubility to be efficient.

The non-fluorinated hydrocarbon group, $R_h$, can be straight chain, branched chain, or cyclic alkyl. $R_h$ is preferably free of polymerizable olefinic unsaturation and can optionally contain catenary heteroatoms such as oxygen divalent or hexavalent sulfur, or nitrogen. Also the non-fluorinated hydrocarbon group can optionally contain epoxide or aziridine functionalities. Preferably, the non-fluorinated hydrocarbon group contains about 1 to 36 carbon atoms, more preferably 10 to 24 carbon atoms.

In the poly(oxyalkylene) radical, $(R^1)_y$, $R^1$ is an oxyalkylene group having 2 to 4 carbon atoms, such as —OCH$_2$CH$_2$—, —OCH$_2$CH$_2$CH$_2$—, —OCH(CH$_3$)CH$_2$—, and —OCH(CH$_3$)CH(CH$_3$)—, the oxyalkylene units in said poly(oxyalkylene) being the same, as in poly(oxypropylene), or present as a mixture, as in a heteric straight or branched chain or randomly distributed oxyethylene and oxypropylene units or as in a straight or branched chain of blocks of oxyethylene units and blocks of oxypropylene units. The poly(oxyalkylene) chain can be interrupted by or include one or more catenary linkages. Where said catenary linkages have three or more valences, they provide a means for obtaining a branched chain or oxyalkylene units. The poly(oxyalkylene) radicals in the oligomers can be the same or different. The molecular weight of the poly(oxyalkylene) radical can be about 750 to 2000, preferably about 900 to 1750.

R², which is a residue of a tri- or higher order isocyanate, can be formed from such isocyanate compounds as polyaromatic polyisocyanate (PAPI, available from Dow Chemical Co. as VORANATE M220), DESMODUR N-100, DESMODUR N-3200 and DESMODUR N-3300 (available from Bayer The fluoroaliphatic radical-containing oxyalkylene urethanes used in this invention can be prepared by condensation homopolymerization or copolymerization using solution, suspension, or bulk polymerization techniques, e.g. see "Preparative Methods of Polymer Chemistry", Sorenson and Campbell, 2nd ed., Interscience Publishers (1968).

Further description of fluorochemical oxyalkylenes useful in this invention will be omitted in the interest of brevity since such compounds and their preparation are known, and described, for example, in U.S. Pat. No. 3,787,351 and U.S. Pat. No. 4,289,892, both of which are incorporated herein for that purpose.

The anti-soiling agents are defined as those materials which are solid, non-tacky water soluble or water dispersible and which upon drying of the composition are capable of rendering the substrate non-tacky and resistant to soiling. Also mixtures of the anti-soiling agent can be used.

Useful anti-soiling agents include colloidal alumina (e.g., CATAPAL and DISPAL aluminas available from Vista Chemical company) and colloidal silica (e.g. NALCO silicas available from Nalco Chemical Company), brittle polymeric resins such as styrene-maleic anhydride copolymers (e.g., SMA Resins available from Atochem), polyvinylpyrrolidone polyacrylate/acrylic acid copolymers (e.g., RHOPLEX resins available from Rohm and Haas), vinyl acetate/maleic anhydride copolymers (e.g., VAMA resins available from Monsanto), carboxymethylcellulose, carboxyl-containing resins (e.g., CARBOSET resins from B.F. Goodrich) and water soluble melamine/formaldehyde condensates.

Preferred anti-soiling agents are styrene/maleic anhydride copolymer salts which preferably have a ratio of styrene to maleic anhydride of about 1:1 to 1:5, preferably about 1:3, an acid number of about 150 to 500, preferably about 275 and a number average molecular weight of about 1000 to 3000, preferably about 2000. The styrene/maleic anhydride copolymer salt can be an ammonium, sodium, potassium or any monovalent salt. The ammonium salt is generally preferred.

A typical chemical structure of the styrene/maleic anhydride copolymer salt is:

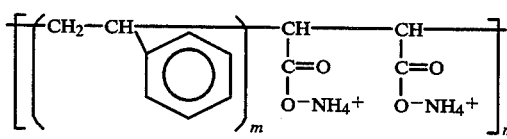

where
m = 1-3
n = 6-8

These products are commercially available, for example, from Atochem as SMA ™-resins. The optional fluorochemical esters useful in the present invention can be formed by reacting a perfluoroalkyl aliphatic alcohol or mixture of alcohols with mono- or polycarboxylic acids which can contain other substituents and which contain from 3 to 30 carbon atoms. Optionally a mixture of perfluoroalkyl aliphatic alcohol and hydrocarbon alcohols can be esterified with the polycarboxylic acids. Such esters are described, for example, in U.S. Pat. No. 4,029,585 (Dettre et al.) which is incorporated by reference herein.

A particularly preferred fluorochemical ester is the fluorochemical adipate ester which can be represented by the formula

wherein $R_f$ and Q are as defined above and n is a number from about 1 to 5, preferably 1 to 3. The fluorochemical adipate ester can be prepared by reacting a precursor fluoroaliphatic radical- and chlorine-containing alcohol with adipic acid.

A method of preparing the alcohol precursors is by reaction of epichlorohydrin with a fluoroaliphatic radical- containing alcohol. Readily available alcohols which can be used in this preparation are those corresponding to the formula

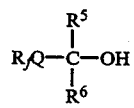

where
$R_f$ and Q are as defined above,
$R^5$ is hydrogen or a lower alkyl, and
$R^6$ is hydrogen, lower alkyl, or aryl of 6 to 12 carbons and $R^5$ and $R^6$ can be connected together to form a cyclic structure, aromatic or cycloaliphatic, including the hydroxyl-bearing carbon atom. When the fluoroaliphatic radical-containing alcohols are reacted with epichlorohydrin to form the corresponding fluoroaliphatic alcohols, the latter can correspond to the formula

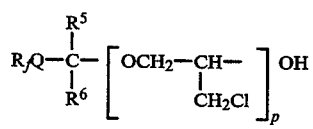

where $R_f$, Q, $R_1$ and $R_2$ are as defined above and p is a small integer, e.g. 1 to 5.

Representative species of fluoroaliphatic compounds containing epoxy-reactive hydrogen atoms which can be used to make the corresponding fluoroaliphatic radical- and chlorine-containing alcohols are those disclosed, for example, in U.S. Pat. No. 4,043,823 (Loudas) and U.S. Pat No. 4,289,892 (Soch).

Such fluorochemical adipate esters are disclosed in U.S. Pat. No. 4,264,484 (Patel) which is incorporated herein by reference.

Substrates which can be treated in accordance with this invention are textile fibers (or filaments) and fabrics, including fabrics made into finished products, made from cotton, polyester, polyolefin, nylon, acrylic, acetate or blends thereof, as well as finished garments, upholstered furniture and installed carpet. Especially good results are obtained on polyolefin and polyester fibers and fabrics. The fibers or filaments as such or in aggregated form, e.g., yarn, tow, web or roving or fabric such as woven or knit fabric can be treated with the composition of the invention. The treatment can be carried out by applying the fluorochemical compositions by known techniques customarily used in applying fluorochemicals to fibers and fabrics. The composition of the invention can advantageously be applied to finished products such as apparel and upholstered furniture without the need for thermal curing and will provide good oil and water repellency even though the composition is aqueous and organic solvent free. Application to such finished products can be, for example, by spraying, brushing, immersion, or foaming. Generally, the amount of fluorochemical composition of the invention which is applied to the fiber or fabric is about 0.5 to 10 weight percent solids, more preferably 1 to 3 weight percent solids, based on the weight of the fiber or fabric (owf). As dispersants, nonionic, anionic, cationic and amphoteric surfactants may be used.

In the examples which follow treated textile materials are tested for oil and water repellency according to the following test methods.

The water repellency of treated samples is measured using a water/isopropyl alcohol test, and is expressed in terms of a water repellency rating (0–10) of the treated carpet or fabric. Treated carpets which are penetrated by or resistant only to a 100 percent water/0 percent isopropyl alcohol mixture (the least penetrating of the test mixtures) are given a rating of 0. Other intermediate values are determined by use of other water/isopropyl alcohol mixtures, in which the percentage amounts of water and isopropyl alcohol are each multiples of 10. The water repellency rating corresponds to the most penetrating mixture which does not penetrate or wet the fabric after 10 seconds contact. In general, a water repellency rating of 1 or 2, is desirable for carpet.

The oil repellency of treated carpet and textile samples is measured by AATCC Standard Test 188-1978, which test is based on the resistance of treated fabric to penetration of oils of varying surface tensions. Treated fabrics resistant only to NUJOL, a brand of mineral oil and the least penetrating of the test oils, are given a rating of 1, whereas treated fabrics resistant to heptane (the most penetrating of the test oils) are given a value of 8. Other intermediate values are determined by use of other pure oils or mixtures of oils. The rated oil repellency corresponds to the most penetrating oil (or mixtures of oils) which does not penetrate or wet the fabric after 30 seconds contact. Higher numbers indicate better oil repellency. In general, an oil repellency of 2 or greater is desirable for carpet.

Stain resistance to non-liquid stains is determined by placing 1 teaspoon (13 ml) of the staining agent on the fabric to be tested. A piece of glossy paper is placed on the staining agent and a five pound (2.27 kg) weight is placed on the paper-covered staining agent for five minutes. The weight and paper are then removed and excess staining agent is blotted. A dilute aqueous ammonium solution (3%) is then brushed on the stain and the stain is again blotted. Application of the ammonium solution is repeated until no additional stain is removed. The fabric is then allowed to dry at room temperature and evaluated for staining on a scale of 1 to 8 with 1 representing severe staining and 8 representing no staining.

Stain resistance to liquid staining is determined by pouring 20 ml of the staining liquid on the fabric to be tested from a height of 30 cm. The liquid is immediately blotted with paper towels. The sample is allowed to dry at room temperature and evaluated for staining on a scale of 1 to 8 with 1 representing severe staining and 8 representing no staining.

Abrasion oil and water repellency are determined by adhering a 5×12.7 cm test sample to the base of an AATCC Crockmeter. A WETORDRY TRI-M-ITE Abrasive Paper No. 600, available from 3M Company, is adhered to the Crockmeter test finger and the abrasive paper is rubbed over the test sample 40 times. The test sample is allowed to equilibrate for 15 minutes and is then tested for oil repellency and water repellency as described above.

Objects and advantages of this invention are shown in the following nonlimiting examples where all parts and percentages given are by weight.

EXAMPLES

Preparation of polyurethane

Example 1

To a 5 liter three-necked flask equipped with a mechanical stirrer, thermometer, reflux condenser, nitrogen inlet tube, and heating mantle was added 1062 g (1.8 moles) N-methyl perfluorooctanesulfonamidoethyl alcohol and 708 g ethyl acetate. After heating with stirring to about 55° C. under nitrogen atmosphere, a premixed solution of 616 g (1.08 moles) of DESMODUR N-100 (trifunctional isocyanate available from Bayer A.G.) and 300 g ethyl acetate was added. Then, 0.84 g stannous octanoate was added and the reaction mixture was stirred at about 75° C. for 6 hours. A premixed solution of 1044 g (0.72 moles) CARBOWAX 1450 (available from Union Carbide) and 807 g ethyl acetate was added. The resulting mixture was stirred and heated at reflux (about 83° C.) for 16 hours. Substantially all of the isocyanate functionality had been converted at this time as indicated by IR spectroscopy.

Examples 2–8 and Comparative Examples C1–C11

The thus-prepared polyurethane solution (150 g) was added to a 1 L three-necked flask equipped with a mechanical stirrer, dropping funnel, thermometer and a heating mantle and heated to 65° C. Distilled water (510 g) heated to 65° C. was added slowly with vigorous stirring. The resulting mixture was stirred for 10 minutes and the ethyl acetate was removed by vacuum stripping to provide a translucent 15% solids dispersion.

Other urethane examples 2–6 were prepared in a similar manner with various components as indicated by the following table.

DESMODUR N-100 is designated as A.

VORANATE M220 (polymethylene polyphenylisocyanate, available from Dow Chemical) is designated as B.

Toluene diisocyanate is designated as C.

Hexamethylene diisocyanate is designated as D.

N-methyl perfluorooctanesulfonamidoethyl alcohol is designated as J.

N-ethyl perfluorooctanesulfonamidoethyl alcohol is designated as K.

ZONYL BA (a fluorochemical telomer alcohol available from Dupont Co.) is designated as L.

An oligomeric fluorochemical alcohol with an average of 4 fluorochemical tails and one —OH reactive site is designated as M (prepared as disclosed in U.S. Pat. No. 3,787,351 in Example 5 except that 4 moles of N-methyl perfluorooctanesulfonamidoethyl acrylate are used for each mole of 2-mercaptoethanol).

The reaction product of J above and epichlorohydrin as disclosed in U.S. Pat. No. 4,264,484 Example 2 wherein the integer n is equal to 2 is designated N.

Stearyl alcohol is designated as P. Some of the polyoxyalkylene diols are CARBOWAX materials available from Union Carbide and are designated as CW xxx where the xxx is a product number related to the molecular weight of the material.

PPG 2000 is a polypropylene glycol available from Aldrich.

PCP 1250 is a polycaprolactone diol available from Aldrich.

Poly THF 2000 is available from Aldrich. Me CW 550 is available from Union Carbide as methyl CARBOWAX 550.

The molar ratio of each component is also indicated. A molar ratio designation of 3 for the n-functional isocyanate actually contains 3n NCO sites and the diols would have 2 —OH sites per mole. Examples 3, 4, 5, C5 and C9 have a hydrocarbon alcohol (P) substituted for some of the fluorochemical alcohol.

TABLE I

| | Fluorochemical Hydrocarbon | | |
|---|---|---|---|
| Ex # | Isocyanate | Alcohol | Diol |
| 2 | A (3 moles) | J (5 moles) | CW 1000 (2 moles) |
| 3 | A (3 moles) | J (4 moles) P (1 mole) | CW 1450 (2 moles) |
| 4 | B (3 moles) | M (1 mole) P (4 moles) | CW 1450 (2 moles) |
| 5 | B (3 moles) | J (3 Moles) P (2 moles) | CW 1450 (2 moles) |
| 6 Comparative | B (3 moles) | K (5 moles) | CW 1450 (2 moles) |
| | A (3 moles) | J (5 moles) | CW 3350 (2 moles) |
| C2 | A (3 moles) | J (5 moles) | MeCW 550 (4 moles) |
| C3 | A (3 moles) | J (5 moles) | CW 2000 (2 moles) |
| C4* | A (2 moles) C (2 moles) | J (4 moles) | CW 200 (3 moles) |
| C5 | A (3 moles) | J (5 moles) | PPG 2000 (2 moles) |
| C6 | D (2 moles) | N (2 moles) | CW 1450 (1 mole) |
| C7 | A (3 moles) | M (2 moles) P (3 moles) | CW 1450 (2 moles) |
| C8** | A (2 moles) C (2 moles) | J (4 moles) | CW 600 (3 moles) |
| C9 | A (4 moles) | J (6 moles) | CW 1450 (3 moles) |
| C10 | A (3 moles) | J (5 moles) | PCP diol 1250 (2 moles) |
| C11 | A (3 moles) | J (5 moles) | Poly THF 2000 (2 moles) |

*Prepared as described in U.S. Pat. No. 4,792,354, Ex. 1, except $C_8F_{17}SO_2N(CH_3)CH_2CH_2OH$ was substituted for $C_nF_{2n+1}C_2H_4OH$.
**Prepared in a manner similar to Example C6 except a polyethylene glycol having a molecular weight of 600 (CW 600) was substituted for the polyethylene glycol having a molecular weight of 200 (CW 200).

For Example 7, a urethane was prepared by charging to a 1-liter 3-neck flask equipped with an overhead stirrer, a thermometer and a reflux condenser 50.8 g DESMODUR N-100, 77.4 g ZONYL BA, 128 g ethyl acetate and 5 drops stannous octanoate. The mixture was heated to 78° C. and the reaction was allowed to proceed for 5.5 hours. Then 81.7 g CARBOWAX 1450, 81.7 g ethyl acetate, and 3 drops stannous octanoate were added. This mixture was allowed to react overnight at 78° C.

Emulsification was carried out by charging 83.3 g of the thus produced urethane with 160 g ethyl acetate and heating the mixture to 70° C. Separately, 450 g water, 2.7 g VARINE C, available from Sherex Co., and 0.9 g acetic acid were mixed and heated to 70° C. The mixtures were combined and homogenized using an ultrasonic emulsifier. The solvent was stripped to produce a 10 weight percent solids emulsion.

For Example 8, a urethane was prepared by charging to a 1-liter 3-neck flask equipped with an overhead stirrer, a thermometer and a reflux condenser 57 g DESMODUR N-100, 54.5 g N-methyl perfluorooctanesulfon-amidoethyl alcohol, 22.5 g stearyl alcohol, 134 g ethyl acetate and 3 drops stannous octanoate. The mixture was heated to 78° C. and the reaction was allowed to proceed for 5 hours. Then 96.7 g CARBOWAX 1450, 64.4 g ethyl acetate, and 3 drops stannous octanoate were added. This mixture was allowed to react for 16 hours at 78° C. IR indicated the presence of isocyanate, so 2 drops stannous octanoate were added and the reaction was allowed to proceed an additional four hours.

Emulsification was carried out by mixing 83.3 g of the resulting urethane solution and 160 g ethyl acetate and heating the mixture to 70° C. 450 g water was heated to 70° C. and added to the urethane mixture. This mixture was stirred for one hour at 70° C. and then homogenized using an ultrasonic emulsifier. The solvent was stripped resulting in a 10 weight percent solids emulsion.

Test results for oil and water repellency on various fibrous substrates are listed in Table II:

The treatment was applied to the substrate by hand spraying. The treated substrate was allowed to dry at room temperature conditions (about 20°–25° C.). A treatment level of 2.0% solids based on the weight of the substrate was used.

TABLE II

| | Test Results | | | | | |
|---|---|---|---|---|---|---|
| | Oil Repellency | | | Water Repellency | | |
| Ex | Cotton | Poly/ Cotton | Olefin | Cotton | Poly/ Cotton | Olefin |
| 1 | 2 | 4 | 2 | 8 | 9 | 3 |
| 2 | 3 | 4 | 2 | 3 | 5 | 3 |
| 3 | 3 | 4 | 2 | 7 | 6 | 3 |
| 4 | 3 | 4 | 4 | 2 | 2 | 2 |
| 5 | 3 | 4 | 2 | 6 | 6 | 2 |
| 6 | 2 | 2 | 1 | 4 | 6 | 2 |
| 7 | 4 | 4 | 2 | 3 | 2 | 2 |
| 8 | 2 | 3 | 2 | 5 | 5 | 3 |
| C1 | 0 | 0 | — | 1 | 0 | — |
| C2 | 2 | 5 | — | 0 | 0 | — |
| C3 | 2 | 2 | 2 | 0 | 0 | 0 |
| C4 | 3 | — | 0 | 4 | — | 0 |
| C5 | did not disperse | | | | | |
| C6 | 3 | — | 4 | 0 | — | 0 |
| C7 | 2 | — | 0 | 0 | — | 0 |
| C8 | 2 | — | 2 | 2 | — | 1 |
| C9 | 2 | — | 1 | 2 | — | 1 |
| C10 | 4 | — | 1 | 8 | — | 0 |
| C11 | 2 | — | 1 | 5 | — | 0 |

The results in Table II demonstrate that the materials of the invention provide good oil and water repellency.

Preparation of blend concentrate

Example 9

To a 2 liter three-necked flask equipped with an overhead stirrer, a thermometer, and a reflux condenser were added 184.6 g of polyurethane (Example 1), 178.7 g of acrylate copolymer described in U.S. Pat. No. 3,787,351 (Example 1, 47% solids in ethyl acetate), 36 g fluorochemical adipate ester described in U.S. Pat. No. 4,264,484 (Example 8), 125 g ethyl acetate, and 960 g of deionized water. The resulting mixture was vigorously stirred for 60 minutes while being heated to 65°–70° C.

The solvent was removed by vacuum stripping to give a 20% solids, stable dispersion.

Examples 10–17 and Comparative Examples C12–C17

The following additional blend examples were prepared in a similar manner to Example 9 with other components substituted as listed. Where components are added as a solution, the weight listed includes the solvent.

SMA 3000 is a styrene/maleic anhydride copolymer available from Atochem.

SMA3000 (salt) is prepared as follows:

Charge vessel with 533 g water and add 100 g styrene maleic anhydride copolymer SMA 3000, while maintaining vigorous stirring.

Slowly add ammonium hydroxide (28%) 34 g, a slight exotherm occurs.

Heat to about 70°–75° C. and maintain temperature and agitation until solution is complete.

After cooling to room temperature, a slightly yellow viscous solution of pH 8.5–9.3 containing approximately 15% solids is obtained.

Acrylate copolymer as described in U.S. Pat. No. 3,787,351, Example 1 is designated as R.

Adipate ester as described in U.S. Pat. No. 4,264,484, Example 8 is designated as S.

The amounts of the components listed in Table III are listed as parts by weight based on the solids of each component.

TABLE III

| Ex # | Urethane from Table I | Acrylate Copolymer | Other |
|---|---|---|---|
| 10 | Ex 1 (80) | — | SMA 3000 (salt) (20) |
| 11 | Ex 1 (40) | R (20) | SMA 3000 (salt) (40) |
| 12 | Ex 1 (75) | R (25) | — |
| 13 | Ex 1 (60) | — | SMA 3000 (salt) (20) S (20) |
| 14 | Ex 5 (50) | R (35) | S (15) |
| 15 | Ex 3 (50) | R (35) | S (15) |
| 16 | Ex 6 (50) | R (35) | S (15) |
| 17 | Ex 2 (50) | R (35) | S (15) |
| C12 | — | R | — |
| C13 | — | R (80) | SMA 3000 (salt) (20) |
| C14 | Ex C10 (50) | R (35) | S (15) |
| C15 | Ex C8 (50) | R (35) | S (15) |
| C16 | Ex C11 (50) | R (35) | S (15) |

Test results for oil and water repellency on various substrates are listed in Table IV. The substrates were treated as described for the substrates tested in Table II.

TABLE IV

| | Blend Test Results | | | | | |
|---|---|---|---|---|---|---|
| | Oil Repellency | | | Water Repellency | | |
| Ex | Cotton | Poly/Cotton | Olefin | Cotton | Poly/Cotton | Olefin |
| 9 | 4 | — | 5 | 9 | 9 | 9 |
| 10 | 2 | 2 | 5 | 6 | 7 | 7 |
| 11 | 5 | 5 | 5 | 8 | 9 | 9 |
| 12 | 4 | 5 | 4 | 7 | 9 | 4 |
| 13 | 4 | — | 5 | 9 | — | 5 |
| 14 | 5 | — | 5 | 8 | — | 9 |
| 15 | 5 | 4 | 5 | 9 | 9 | 6 |
| 16 | 6 | 6 | 5 | 8 | 10 | 7 |
| 17 | 4 | — | 5 | 7 | — | 3 |
| C12 | 5 | 5 | 3 | 9 | 6 | 0 |
| C13 | 5 | 5 | 4 | 9 | 9 | 0 |
| C14 | 3 | — | 5 | 7 | — | 1 |
| C15 | 4 | — | 2 | 6 | — | 0 |
| C16 | 3 | — | 4 | 3 | — | 0 |

The results in Table IV demonstrate that the blends of the invention provide significant water repellency improvements on olefinic substrates.

Examples 18–20 and Comparative Examples C17–C19

The following substrates were evaluated for staining by comparing an untreated substrate with a substrate treated with Example 9.* The treated substrate was hand sprayed to a wet pick up of 50% resulting in a treatment level of 2.0% solids on substrate.

*The following stains were evaluated:
CI = chocolate ice cream   M = mustard
B = butter                 KA = kool-aid
SS = spaghetti sauce       CF = coffee
K = ketchup

TABLE V

| | STAIN TEST RESULTS | | | | | | |
|---|---|---|---|---|---|---|---|
| Ex. No. | Treatment | CI | B | SS | K | M | KA | CF |
| | 100% Cotton | | | | | | | |
| 18 | Example 9 | 6.5 | 3.0 | 5.0 | 6.5 | 4.0 | 5.5 | 5.5 |
| C17 | none | 2.5 | 4.0 | 3.5 | 3.5 | 2.0 | 2.0 | 1.5 |
| | 65/35% Polyester/Cotton | | | | | | | |
| 19 | Example 9 | 8.0 | 2.5 | 6.0 | 7.5 | 6.0 | 7.0 | 7.5 |
| C18 | none | 4.0 | 2.0 | 2.5 | 7.5 | 3.0 | 4.5 | 2.0 |
| | 100% Polypropylene | | | | | | | |
| 20 | Example 9 | 7.5 | 4.0 | 4.0 | 5.0 | 5.0 | 7.0 | 6.0 |
| C19 | none | 4.5 | 3.5 | 3.5 | 5.0 | 2.5 | 3.5 | 5.5 |

The test results in Table V indicate significant stain removal improvements over untreated fabric.

Examples 21–26

In examples 21 and 24, solutions were made as described in Example 9 except the amount of the acrylate copolymer was reduced from 35% of the total solids to 25%. The 10% reduction was replaced with an anti-soiling additive NALCO 1056 (a dispersed silica available from Nalco Chemical Co.).

Examples 22 and 25 were prepared in a similar manner except the anti-soiling additive used was DISPAL CAT "A" Ho Ac (a dispersed alumina available from Vista Chemical Co.).

Examples 23 and 26 were was prepared in a manner similar to Example 21 except the anti-soiling agent used was DISPAL 21N4-80 (a dispersed alumina available from Vista Chemical Co.).

The treatment compositions were hand sprayed on the following substrates to yield 1.5% solids on substrate after air drying.

Table VI lists results for oil repellency (OR), water repellency (WR), abrasion oil and water repellency.

TABLE VI

| Example | OR | WR | ABR O/W |
|---|---|---|---|
| | 100% Cotton Substrate | | |
| 21 | 4 | 8 | 5/9 |
| 22 | 4 | 8 | 5/9 |
| 23 | 4 | 9 | 6/9 |
| | 100% polypropylene | | |
| 24 | 4 | 8 | 4/8 |
| 25 | 4 | 8 | 4/8 |
| 26 | 4 | 8 | 4/8 |

The results in Table VI indicate the blends are effective with anti-soiling additives.

The various modifications and alterations of this invention will be apparent to those skilled in the art without departing from the scope and spirit of this invention and this invention should not be restricted to that set forth herein for illustrative purposes.

We claim:

1. Fluorochemical compositions for treating textile fibers and fabrics to impart oil and water repellency without thermal treatment, comprising an aqueous, substantially organic solvent free, solution or dispersion of
   (a) a fluorochemical acrylate copolymer comprising the reaction product of a fluorinated acrylate monomer, polyalkylene glycol acrylate or methacrylate, and polyalkylene glycol diacrylate or dimethacrylate; and
   (b) a polyalkoxylated polyurethane having pendant perfluoroalkyl groups comprised of an aliphatic or aromatic tri- or higher order isocyanate, a fluorinated alcohol, amine, or mercaptan, and a poly(oxyalkylene) diol or dithiol, said polyalkyoxylated polyurethane having a weight average molecular weight of at least 40,000.

2. The composition of claim 1 wherein the polyalkoxylated polyurethane having pendant perfluoroalkyl groups is represented by the formula

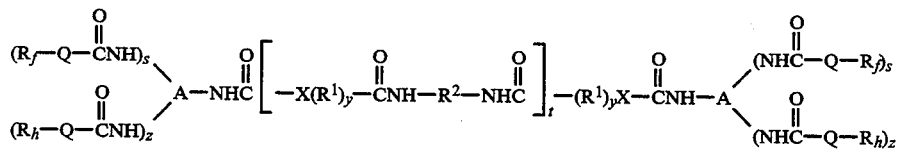

where
   $R_f$ is a fluoroaliphatic radical,
   $R_h$ is a non-fluorinated hydrocarbon radical,
   Q is an organic linking group,
   A is a residue of a tri- or higher order isocyanate, i.e., the residue being that portion of the tri- or higher order isocyanate minus the reacted —NCO groups,
   $(R^1)_y$ is a poly(oxyalkylene) moiety, $R^1$ being an oxyalkylene group with 2 to 6 carbon atoms or a cyclic ether or ester moiety having 2 to 6 carbon atoms and y is a number of about 10 to 50,
   X is O, S or a linking group terminating in O or S,
   $R^2$ is a residue of a tri- or higher order isocyanate, two of the isocyanate groups of the tri- or higher order isocyanate forming the depicted urethane groups and the other isocyanate groups reacted to form pendant —$QR_f$ or —$QR_h$ groups,
   s is a number of at least 1 and can be 3 or higher,
   z is zero or a number of up to about 4,
   s+z is a number of about 4 or higher, and
   t is a number of at least about 10 and can be 40 or more.

3. The composition of claim 2 wherein t is 15 to 35.

4. The composition of claim 2 wherein the polyalkoxylated polyurethane having pendant perfluoroalkyl groups has a weight average molecular weight in the range of about 65,000 to 250,000.

5. The composition of claim 1 wherein the fluorochemical acrylate polymers have randomly arranged repeating units

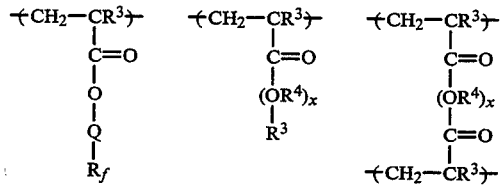

wherein $R_f$ is a fluoroaliphatic radical, $R^3$ is H or $CH_3$, $R^4$ is an alkylene group having 2 to 4 carbon atoms, Q is an organic linking group and x is an integer of at least 5, generally 10 to 75 and can be as high as 100.

6. The composition of claim 1 further comprising a solid, non-tacky, water-soluble or water dispersible anti-soiling agent which, upon drying of the composition, is capable of rendering the substrate non-tacky and resistant to soiling.

7. The composition of claim 1 wherein said fluorochemical acrylate polymer comprises 10 to 50 weight percent and said polyalkoxylated polyurethane comprises about 50 to 90 weight percent of said composition.

8. The composition of claim 6 wherein said anti-soiling agent comprises up to 30 weight percent of said composition.

9. The composition of claim 6 wherein said anti-soiling agent is a styrene/maleic anhydride copolymer.

10. The composition of claim 1 further comprising a fluorochemical ester.

11. The composition of claim 10 wherein said fluorochemical ester comprises up to 30 weight percent of said composition.

12. The composition of claim 10 wherein said fluorochemical ester is a fluorochemical adipate ester.

13. The composition of claim 1 further comprising an anti-soiling agent and a fluorochemical ester.

14. The composition of claim 13 wherein said anti-soiling agent and said fluorochemical ester comprise up to 50 weight percent of said composition.

15. The composition of claim 1 wherein said fluorochemical acrylate polymers have randomly arranged repeating units

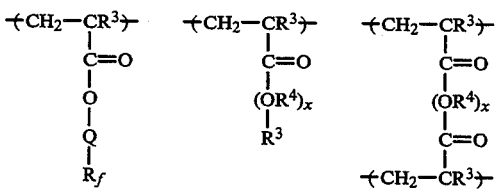

where
   $R_f$ is a fluoroaliphatic radical, $R^3$ is H or $CH_3$, $R^4$ is an alkylene group having 2 to 4 carbon atoms, Q is an organic linking group and x is an integer of at least 5, generally 10 to 75 and can be as high as 100.

16. The composition of claim 15 wherein said fluorochemical acrylate polymer is a polyoxyethylene terpolymer of

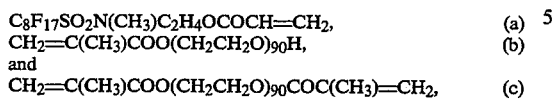

preferably in a 1:1 weight ratio of a:(b+c) and a 3:1 weight ratio of b:c.

17. A method for imparting oil and water repellency to fibers and fabrics comprising (a) contacting said fiber or fabric at ambient temperature with the aqueous composition of claim 1 and (b) allowing said fiber or fabric to dry at ambient temperature.

18. Textile fibers and fabrics having oil and water repellency comprising said fibers and fabrics treated with the composition of claim 1.

19. Composition comprising a polyalkoxylated polyurethane having pendant perfluoroalkyl groups which is represented by formula I where

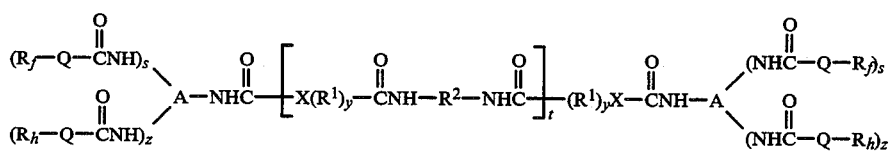

$R_f$ is a fluoroaliphatic radical, $R_h$ is a non-fluorinated hydrocarbon radical, Q is an organic linking group, A is a residue of a tri- or higher order isocyanate, i.e., the residue being that portion of the tri- or higher order isocyanate minus the reacted —NCO groups, $R^1)_y$ is a poly(oxyalkylene) moiety, $R^1$ being an oxyalkylene group with 2 to 6 carbon atoms or a cyclic ether or ester moiety having 2 to 6 carbon atoms and y is a number of about 10 to 50, X is O, S or a linking group terminating in O or S, $R^2$ is a residue of a tri- or higher order isocyanate, two of the isocyanate groups of the tri- or higher order isocyanate forming the depicted urethane groups and the other isocyanate groups reacted to form pendant —$QR_f$ or —$QR_h$ groups, s is a number of at least 2 and can be 3 or higher, z is zero or a number of up to about 2, s+z is a number of about 2 to 4 or higher, and t is a number of at least about 10 and can be 40 or more, said polyalkyoxylated polyurethane having a weight average molecular weight of at least 40,000.

20. The composition of claim 19 wherein t is 15 to 35.

21. The composition of claim 19 wherein the polyalkoxylated polyurethane having pendant perfluoroalkyl groups has a weight average molecular weight in the range of about 65,000 to 250,000.

22. A method for imparting oil and water repellency to fibers and fabrics comprising (a) contacting said fiber or fabric at ambient temperature with an aqueous solution of the composition as claimed in claim 19 and (b) allowing said fiber or fabric to dry at ambient temperature.

23. The composition according to claim 2 in which y of the moiety $(R^1)_y$ is 20 to 35.

24. The composition according to claim 19 in which y of the moiety $(R^1)_y$ is 20 to 35.

* * * * *

UNITED STATES PATENT AND TRADEMARK OFFICE
CERTIFICATE OF CORRECTION

PATENT NO. : 5,350,795
DATED : September 27, 1994
INVENTOR(S) : Richard S. Smith and Frans Audenaert It is certified that error appears in the above-indentified patent and that said Letters Patent is hereby corrected as shown below:

Col. 5, first formula

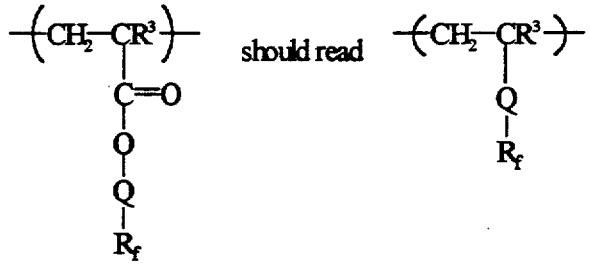

Col. 5, line 36     "CH3" should read -- $CH_3$ --

Col. 6, line 6     "polytaerizable" should read -- polymerizable --

Col. 9, line 8     after "Bayer" insert -- A.G.). --

Col. 13, line 35     at beginning of line insert -- C1 --

Col. 14, line 49     at end of line beginning with "C7", the "0" should read -- 1 --

Col. 19, line 22     delete "where"

Col. 19, line 30     insert -- where --

Signed and Sealed this

Twenty-fifth Day of April, 1995

Attest:

BRUCE LEHMAN

*Attesting Officer*     *Commissioner of Patents and Trademarks*